Nov. 20, 1962     I. ELLIOTT     3,065,079
BREAD TREATMENT METHOD AND APPARATUS THEREFOR
Filed Sept. 19, 1958     2 Sheets-Sheet 2

INVENTOR
IRWIN ELLIOTT
BY
ATTORNEYS

United States Patent Office 3,065,079
Patented Nov. 20, 1962

3,065,079
BREAD TREATMENT METHOD AND
APPARATUS THEREFOR
Irwin Elliott, Croton-on-Hudson, N.Y., assignor of one-half percent to Richard H. Williams, Northport, Long Island, N. Y.
Filed Sept. 19, 1958, Ser. No. 762,150
8 Claims. (Cl. 99—86)

The object of my invention is to provide an improved method and mechanism for dehydrating and toasting bread slices, also for treating the slices before dehydration and toasting.

It is well known that bread may be kept indefinitely when dehydrated and toasted since this treatment kills the spore and fungi which cause mold. Bread slices thus treated are reduced to approximately 60% of the original weight and 50% of the original bulk.

By the addition of substances which enhance the nutritional value of bread slices they become of great value for ration packs used by the military, for export to needy countries, and for general food conservation in remote areas. The food product may be similar to the melba toast type product on the market today.

I provide a feeding mechanism for coating the bread slices with salt, sugar, malt, vitamin enriched cereal or any other powdered or granular substance desired.

After the slices have been coated they are conveyed through a steam chamber which sufficiently moistens the slices to cause the added substance to adhere.

Further adherance is acquired by compressing the slices and holding them between wire mesh conveyor belts which in turn tend to force the powder or granular substance into the surface of the bread.

More particularly, my invention comprises a conveying system having spaced flights which carry bread through an oven for dehydration and toasting. One of the flights extends upstream farther than the other flight and has spacer bars extending downstream therewith which provide runways and guide the movement of the bread to the upstream end of the other flight. Means are provided for moistening the bread and means are provided for compressing the moistened bread to a predetermined thickness. If desired, edible ingredients such as seasoning can be sprinkled on the bread prior to the moistening of the bread. The flights of the conveyor system are moved in the same direction and at the same speed. These flights are foraminated belts which maintain the compressed condition of the bread and impart a distinctive design to the surface of the bread. The opposed surfaces of the flights slidably engage the spacer bars which, in turn, regulate the space between flights through which the bread is carried. Preferably, the flights extend horizontally and guide rails support the lower flight; the spacer bars support the upper flight.

Various other objects and meritorious features of my invention will be apparent from the following description taken in conjunction with the drawings wherein like numerals refer to like parts through the several figures and wherein.

Figure 1:
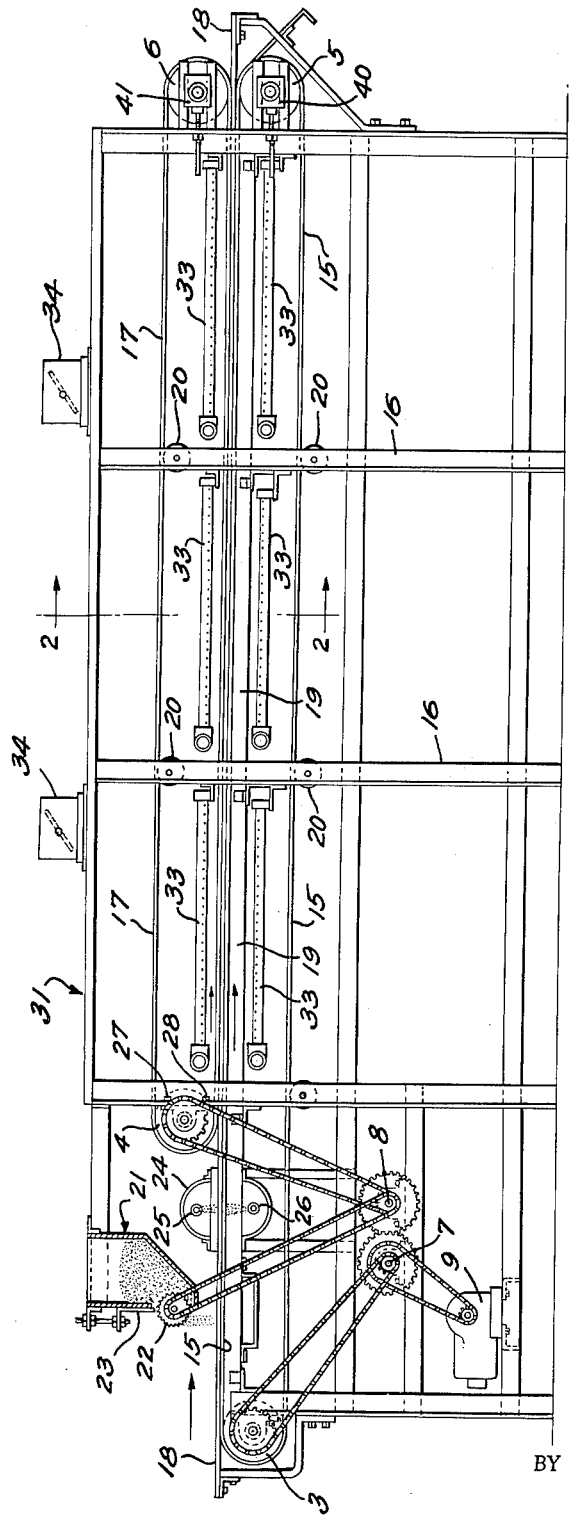
FIG. 1 is a side elevation partly in cross section of my invention with the oven insulation removed for clarity.

Referring now to FIG. 1, it will be seen that my invention comprises a frame 16 on which is mounted a gear-head motor 9, which, through suitable transmission means, including cross shafts 7 and 8, and sprocket and chain drives causes rotation of drive pulleys 3 and 4 at the upstream end portion of the machine. A lower endless belt 15 is mounted on pulley 3 and extends downstream to pulley 5, pulley 5 being adjustably mounted to the frame 16 by mounting means 40 to enable regulation of the belt tension.

Similarly, an upper endless belt 17 is mounted on pulley 4 and extends downstream to pulley 6 which is adjustably mounted by mounting means 41 to the frame 16. The upper surface of lower belt 15 and the lower surface of upper belt 17 provide opposed flights between which is sandwiched the bread to be dehydrated and toasted.

Guide rails 19 extend between the pulleys 3 and 5 in supporting contact with and beneath the upper flight of the lower belt to support the belt and provide a substantially level surface; these guide rails 19 (FIG. 2) being spaced across the width of the belt and mounted to the frame 16.

Spacer bars 18 are mounted on the frame 16 and extend from the upstream end of the lower flight to the downstream end thereof, passing through the space between flights. These spacers bars 18 are preferably adjustably spaced transversely of the width of the flights a predetermined distance in accordance with the dimension of the bread to be toasted. It will be recognized that these spacer bars 18 may be adjusted when required to accommodate various sizes of bread. Further, it will be recognized that these spacer bars may be shimmed to increase the space between flights when bread of greater thickness is to be treated. The upper surface of the spacer bars 18 supports the upper flight formed by the lower portion of the upper belt 17 and maintains this flight in a substantially level plane.

The opposed flights of belts 15 and 17 are driven at the same speed and in the same direction by the drive means previously described, the underside surface of the flight of lower belt 15 slidably engaging the upper surface of the guide rails 19 and the outer side surface of the flight of upper belt 17 slidably engaging the upper surface of the spacer bars 18. Support rollers 20 are mounted transversely on the frame at suitable spaced locations for carrying the weight of the returning outer portions of the belts 15 and 17.

A seasoner means 21 is mounted on the frame 16 at a position upstream from the upstream end of pulley 4. The seasoner has a feeding roller 22 which is driven through a suitable chain and sprocket drive from cross shaft 8 thereby coordinating the dispensing of seasoning with the rate of travel of the belts. A gate 23 is provided for adjusting the flow opening in the seasoner 21.

A moistener means 24 is mounted on the frame 16 between the seasoner 21 and the pulley 4. An upper moistening sprayer 25 and a lower moistening sprayer 26 spray a moisture agent on to the upper and lower surfaces of the bread passing therethrough on a foraminous belt 15. This moistening operation conditions the bread for the pressing step and facilitates the compression of the bread. Also the moistening step causes seasoning to adhere to the upper surface of the bread.

Figure 3:
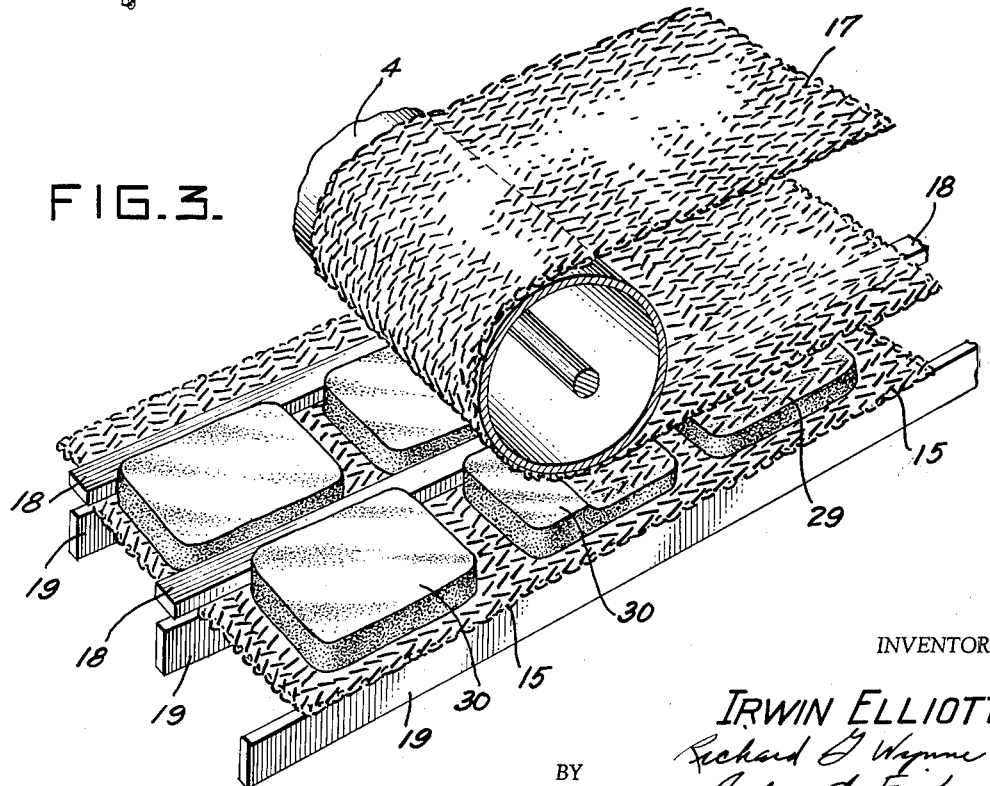
FIG. 3 is a perspective view partly in cross section showing the bread being compressed as it passes into the oven on the preferred woven wire belts.

The belts 15 and 17 are preferably wire mesh conveyor belts as shown in FIG. 3, this construction facilitating the passage of heat to the bread, the moistening of the bread, and enabling the production of a bread product having distinctive surface design.

The pulley 4 as seen in FIG. 3 carries the upper belt 17 and causes movement thereof; roller 4 also serves the function of pressing the bread to the desired thickness of the finished product. The roller 4 is vertically adjustable on the frame 16 by means of adjusting bolts 27 and 28 which pass through elongated slots in the frame. At the pressing station the lower belt 15 is pressed against the guide rails 19, and the bread is compressed and sandwiched between the opposed flights of the belts 15 and 17. The distinctive surface design imparted to the bread by the wire belt is shown in FIG. 3 on bread unit 29. Bread unit 30 is in the process of being compressed.

Figure 2:
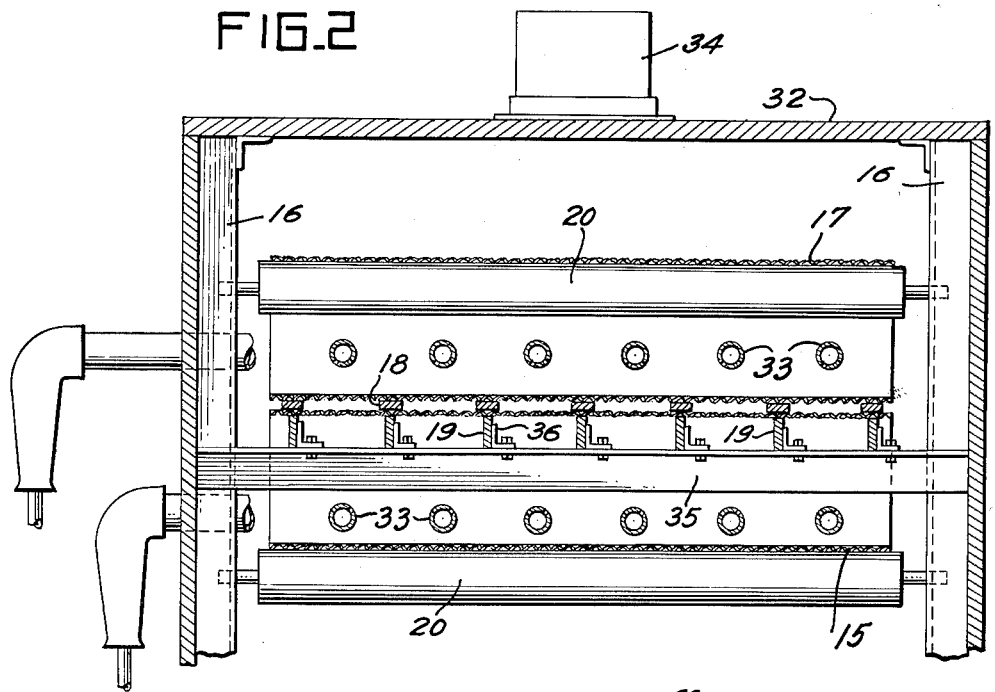
FIG. 2 is a view in cross section taken on line 2—2 of FIG. 1 with the oven insulation installed.

Once the bread is sandwiched between the opposed flights, it passes into the oven portion 31 shown in FIG. 1 wherein the insulation material for the oven has been removed for purposes of clarity. As seen in FIG. 2, the insulation material 32 encloses the top and vertical walls of the oven 31 to provide a heated zone, the bottom of the oven being open to provide the air needed for combustion of gas delivered to the oven by the gas burners 33. It will be noted that the gas burners 33 are mounted on opposite sides of the belts carrying the bread through the oven 31 thereby accomplishing heating and toasting of both sides of the bread at the same time. Suitable vents 34 are provided in oven 31 for exhausting the products of combustion. At the downstream end of the apparatus provision may be made for delivering the toasted bread product to a conveying system for ultimate delivery to an automatic packaging machine.

It will be noted that the guide rails 19 are mounted on transverse members 35 (FIG. 2) by means of angle irons 36. The guide rails 19 present a narrow top surface for supporting the weight of the upper flight of belt 15. Preferably, the spacer bars 18 are mounted directly above the guide rails 19 and are spaced therefrom a distance substantially equal to the thickness of the wire belt 15.

Referring to FIG. 1, it will be seen that my method for treating bread includes the steps of moistening the bread at the moistener 24 by the technique of directing moisture toward opposite surfaces of the bread. The moistened bread is then compressed to a predetermined thickness established by the spacer bars 18, the compressing action being caused by annular segments of the pulley 4 acting through the flights of the foraminous conveyor belts. After compression the bread is sandwiched between the foraminous conveyor flights and is conveyed through a predetermined path in the oven 31. Heat is applied to the conveyed sandwiched bread by means of the gas burners 33 in the oven; the bread is conveyed through the oven for a predetermined period of time to accomplish the desired toasting and dehydration. The treated bread product is then discharged from the downstream end of the apparatus. Preferably an edible substance is deposited on the surface of the bread by means of the seasoner 21 and this operation preferably precedes the moistening step to accomplish even spreading and enable greater adherence of the edible substance when the bread passes through the moistening and compressing steps.

Various modifications of this invention will be apparent to those skilled in the art and for that reason I wish to limit myself only within the scope of the appended claims.

I claim:

1. In a machine for treating bread, first and second opposed foraminated conveyor flights extending in a predetermined spaced relation along a predetermined path of travel, means connected to said flights for moving said flights in the same direction and at the same speed, said first flight having an entry end portion positioned upstream of the upstream end of said second flight, spacer bars mounted in a transversely spaced pattern and extending downstream over and along the first flight from the entry end portion thereof to provide guide means adopted for guiding the movement of bread placed on said first flight, means operatively associated with said first flight for moistening the bread, means operatively associated with said first flight and downstream from the moistening means for compressing the resultatnt moistened bread, said first and second flights being spaced apart a predetermined distance and adapted to sandwich the compressed bread therebetween, and oven means housing a substantial portion of the spaced conveyor flights.

2. In a machine for toasting bread, an endless lower belt, an endless upper belt spaced from and extending parallel to and over said lower belt, the opposed surfaces of the lower and upper belts defining a space for accommodating bread, means for moving the upper and lower belts in the same direction and at the same speed, said lower belt extending upstream beyond the upstream end of said upper belt, spacer bars transversely positioned over said lower belt and extending in parallel spaced relation from the upstream end of said lower belt through the space between said belts, means operatively associated with said first flight for moistening the bread, means positioned in the upstream end of the upper belt for compressing bread, said belts being spaced apart a predetermined distance and adapted to saidwich the compressed bread therebetween, and oven means housing a substantial portion of the spaced belts.

3. In a machine in accordance with claim 2, and wherein said means for driving said belts includes pulleys at each end of each belt, said means for compressing the bread including laterally spaced annular portions of the upstream upper belt pulley which press the upper belt downward to the top surface level of said spacer bars.

4. In a machine in accordance with claim 3, and wherein guide rails are mounted below and in supporting engagement with the upper level of said lower belt to maintain the upper level in a substantially flat condition.

5. In a machine in accordance with claim 4, and wherein each of said belts is woven of wire to provide a foraminated moving holder for the bread and provide a distinctive design on the surface of the toasted end product.

6. In a machine in accordance with claim 5, and wherein means for coating the bread with an edible substance is mounted upstream of said means for moistening the bread and over said lower belt.

7. A method for treating bread comprising the steps of depositing an edible substance on the surface of the bread, directing moisture toward opposite surfaces of the bread to moisten the bread and increase adherence of the edible substance to the bread, compressing the resultant moistened bread to a predetermined thickness, sandwiching the compressed bread between longitudinal horizontally extending woven wire belt conveyor flights, conveying the sandwiched bread in a longitudinal horizontally extending path through an oven, applying heat to opposite surfaces of the sandwiched bread for a predetermined period of time to accomplish toasting and dehydration, and discharging the resultant treated bread product.

8. In a machine for treating bread, first and second opposed woven wire conveyor flights extending in a predetermined spaced relation along a predetermined path of travel, means connected to said flights for moving said flights in the same direction and at the same speed, means for moistening bread operatively associated with the upstream end of said first flight for directing moisture toward opposite surfaces of said flight, means operatively associated with said first flight and downstream from the moistening means for compressing the resultant moistened bread, said first and second flights being spaced apart a predetermined distance and adapted to sandwich the compressed bread therebtween, and oven means housing a substantial portion of the spaced conveyor flights.

References Cited in the file of this patent

UNITED STATES PATENTS

| | | | |
|---|---|---|---|
| Re. 22,399 | Fonken | Dec. 7, | 1943 |
| 441,961 | Mohring | Dec. 2, | 1890 |
| 889,465 | Keller | June 2, | 1908 |
| 1,666,335 | Lentz | Apr. 17, | 1928 |
| 1,805,018 | Scruggs | May 12, | 1931 |
| 1,965,082 | McKee | July 3, | 1934 |
| 2,051,303 | Leichter | Aug. 18, | 1936 |
| 2,349,582 | Tastosian | May 23, | 1944 |
| 2,349,583 | Tastosian | May 23, | 1944 |
| 2,703,521 | Marriott | Mar. 8, | 1955 |
| 2,817,875 | Harris | Dec. 31, | 1957 |

FOREIGN PATENTS

| | | | |
|---|---|---|---|
| 683,695 | France | Mar. 4, | 1930 |

UNITED STATES PATENT OFFICE

CERTIFICATE OF CORRECTION

Patent No. 3,065,079                      November 20, 1962

Irwin Elliott

It is hereby certified that error appears in the above numbered patent requiring correction and that the said Letters Patent should read as corrected below.

In the grant, line 2, and in the heading to the printed specification, lines 4 and 5, for "assignor of one-half percent to Richard H. Williams", each occurrence, read -- assignor of one-half to Richard H. Williams --.

Signed and sealed this 9th day of July 1963.

(SEAL)
Attest:

ERNEST W. SWIDER
Attesting Officer

DAVID L. LADD
Commissioner of Patents